(12) United States Patent
Vaseloff et al.

(10) Patent No.: US 7,628,107 B2
(45) Date of Patent: *Dec. 8, 2009

(54) FOOD PRODUCT TIMING SYSTEM

(75) Inventors: Dennis John Vaseloff, Gurnee, IL (US); Richard Lowell Thorne, Elgin, IL (US); Loren Jay Veltrop, Deerfield, IL (US)

(73) Assignee: Prince Castle, Inc., Carol Stream, IL (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/743,238

(22) Filed: May 2, 2007

(65) Prior Publication Data

US 2007/0199931 A1    Aug. 30, 2007

Related U.S. Application Data

(63) Continuation of application No. 10/234,297, filed on Sep. 4, 2002, now Pat. No. 7,258,064.

(51) Int. Cl.
*A47J 39/00*    (2006.01)
*A47J 37/00*    (2006.01)
*H05B 1/02*    (2006.01)

(52) U.S. Cl. .............................. 99/468; 99/374; 99/448; 99/483; 219/214; 219/486; 219/494; 219/506

(58) Field of Classification Search ................... 99/448, 99/468, 483, 373, 374, 467, 331; 219/521, 219/494, 486, 506, 214, 395
See application file for complete search history.

(56) References Cited

U.S. PATENT DOCUMENTS

| 4,388,689 | A | 6/1983 | Hayman et al. |
|---|---|---|---|
| 4,530,067 | A | 7/1985 | Dorr |
| 4,569,421 | A | 2/1986 | Sandstedt |
| 4,922,435 | A | 5/1990 | Cahlander et al. |
| 5,003,472 | A | 3/1991 | Perrill et al. |
| 5,093,556 | A | 3/1992 | Oelfke |

(Continued)

FOREIGN PATENT DOCUMENTS

JP    8000414    1/1996

(Continued)

OTHER PUBLICATIONS

Taco Bell Steam Table Timer operator's manual, Aug. 19, 1994.

(Continued)

*Primary Examiner*—Reginald L Alexander
(74) *Attorney, Agent, or Firm*—Kelly & Krause, LP; Joseph P. Krause

(57) ABSTRACT

A food timing system is disclosed that includes a number of timer modules associated with food holding devices in a restaurant. The timer modules are connected in a network for communicating information about the food being held in food holding compartments of the food holding devices. Each timer module includes a plurality of timers, with each timer being associated with a food holding compartment of a food holding device. The timers measure the holding time of food in each food holding compartment and are capable of transferring the holding time to another timer when the food is transferred to a holding compartment associated with the other timer.

24 Claims, 10 Drawing Sheets

U.S. PATENT DOCUMENTS

| | | |
|---|---|---|
| 5,128,862 A | 7/1992 | Mueller |
| 5,132,914 A | 7/1992 | Cahlander et al. |
| 5,172,328 A | 12/1992 | Cahlander et al. |
| 5,188,020 A | 2/1993 | Buchnag |
| 5,218,527 A | 6/1993 | Ishikawa et al. |
| 5,253,564 A | 10/1993 | Rosenbrock et al. |
| 5,357,426 A | 10/1994 | Morita et al. |
| 5,504,589 A | 4/1996 | Montague et al. |
| 5,510,979 A | 4/1996 | Moderi et al. |
| 5,539,671 A | 7/1996 | Albrecht et al. |
| 5,553,312 A | 9/1996 | Gattey et al. |
| 5,579,952 A | 12/1996 | Fiedler et al. |
| 5,590,586 A | 1/1997 | Ulfig et al. |
| 5,616,269 A | 4/1997 | Fowler et al. |
| 5,653,906 A | 8/1997 | Fowler et al. |
| 5,724,886 A | 3/1998 | Ewald et al. |
| 5,772,072 A | 6/1998 | Prescott et al. |
| 5,812,393 A | 9/1998 | Drucker |
| 5,939,974 A | 8/1999 | Heagle et al. |
| 5,947,012 A | 9/1999 | Ewald et al. |
| 6,011,243 A | 1/2000 | Arnold et al. |
| 6,026,372 A | 2/2000 | Savage |
| 6,052,667 A | 4/2000 | Walker et al. |
| 6,088,681 A | 7/2000 | Coleman et al. |
| 6,119,587 A | 9/2000 | Ewald et al. |
| 6,200,944 B1 | 3/2001 | Dovey et al. |
| 6,658,994 B1 | 12/2003 | McMillan |
| 7,105,779 B2 | 9/2006 | Shei |

FOREIGN PATENT DOCUMENTS

| | | |
|---|---|---|
| JP | 10079088 | 3/1998 |
| JP | 11342061 | 12/1999 |
| WO | WO-01/31533 A1 | 5/2001 |

OTHER PUBLICATIONS

Merlin II Timers product brochure, 1998.

FOOD PRODUCT TIMING SYSTEM

CROSS-REFERENCE TO RELATED APPLICATIONS

This patent is a continuation of U.S. Ser. No. 10/234,297, filed Sep. 4, 2002, now U.S. Pat. No. 7,258,064, the disclosure of which is hereby expressly incorporated for all purposes.

FIELD OF THE INVENTION

The present invention relates generally to food preparation systems, and more particularly to a timing system for use in connection with storing cooked food products.

BACKGROUND OF THE INVENTION

Success of a fast food restaurant depends on how fast a customer can be served with fresh food. Ideally, if the rate at which a restaurant cooks a food product and the rate at which the food product is sold are equal, the restaurant will have fresh food on hand and ready to serve. In other words, for the ideal fast food restaurant operation, the operator must know how many food products will be sold in the future. Although historical sales data for a food product can be used to predict future rates of sale, the prediction is highly approximate and subject to numerous unpredictable events and variables that the historical data do not reflect. As a result, a restaurant operator must precook a certain number of food products and have the cooked products on hand for immediate service.

Precooked food products cannot be stored for prolonged periods and must be heated during storage to assure freshness. The period before the food product is no longer considered fresh or is spoiled varies with each food product. Therefore, it would be beneficial to have a food storage system for storing and heating various precooked food products at storage temperatures and for periods suitable for each type of food products.

BRIEF DESCRIPTION OF THE DRAWINGS

Preferred exemplary embodiments of the invention are set forth in the following detailed description and accompanying drawings in which like reference numerals represent like parts throughout and in which.

DETAILED DESCRIPTION OF THE PREFERRED EMBODIMENTS

Figure 1:
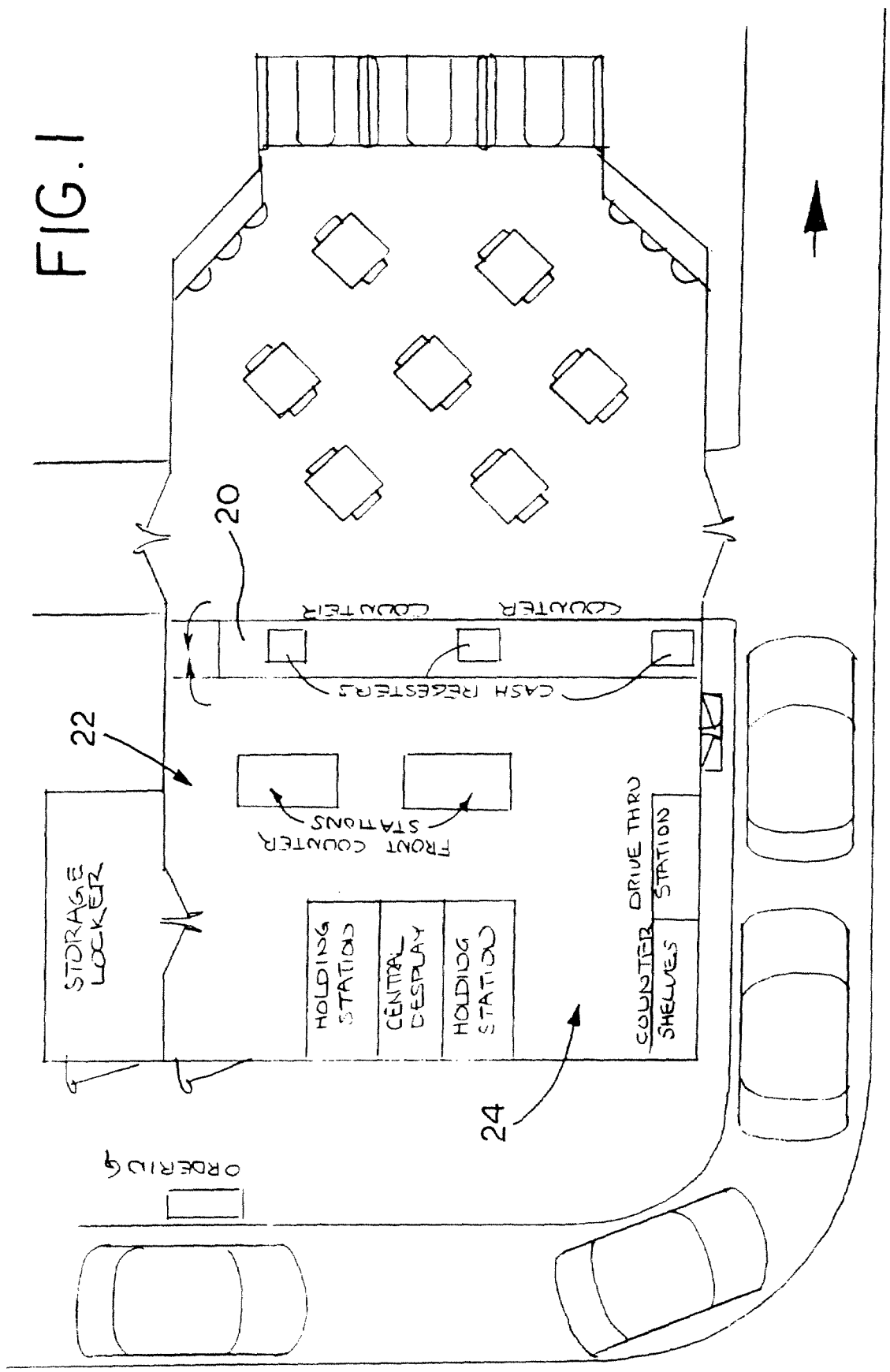
FIG. 1 is an schematic drawing of an interior layout of a fast food restaurant.

Referring to FIG. 1, a fast food restaurant typically includes a front counter 20 for taking customer orders and serving food to customers, a food preparation area 22, and a drive-through area for taking orders from drive-through customers and serving the customers their food through a window 24.

Figure 2:
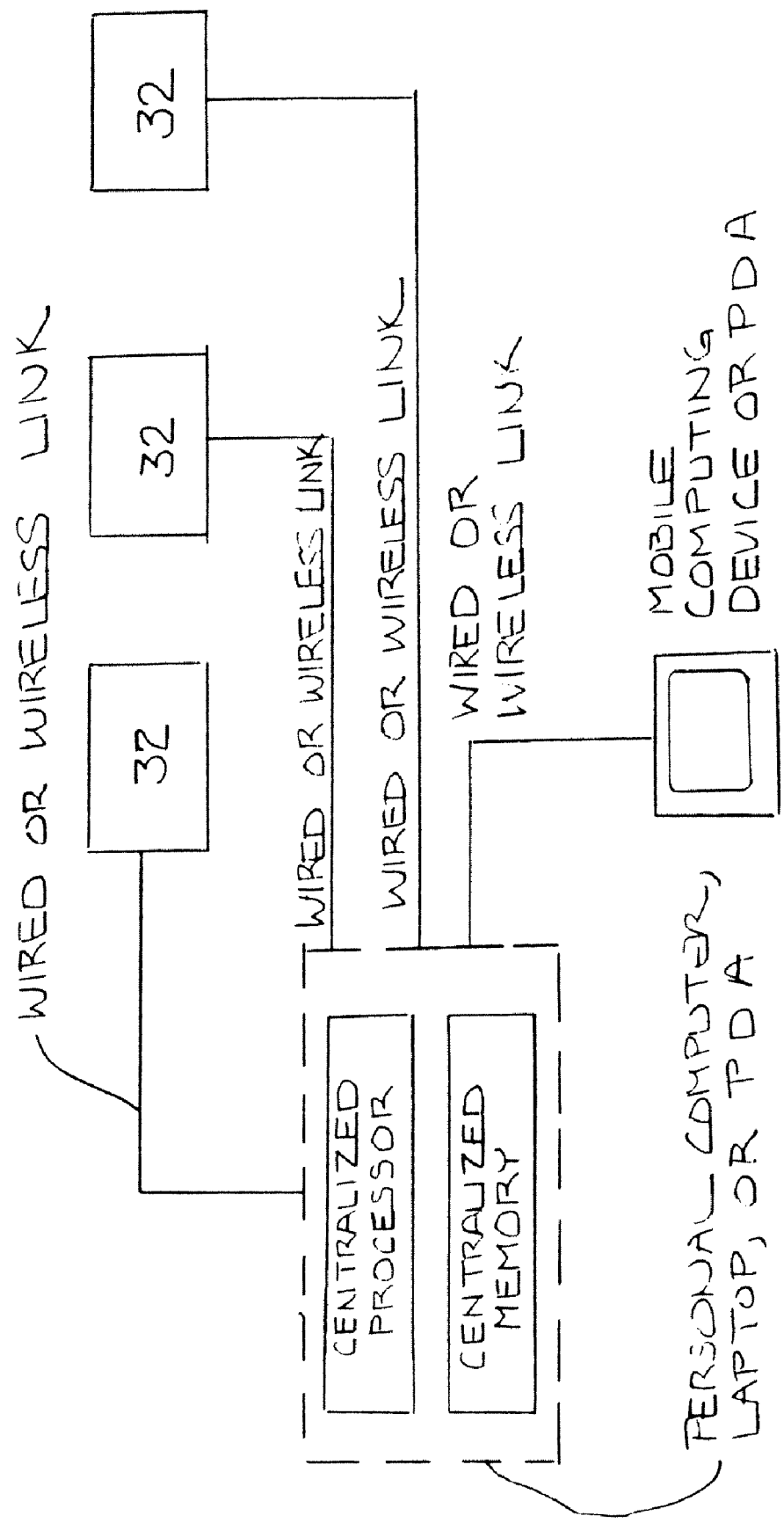
FIG. 2 is a block diagram of a food timing system in accordance with the present invention.

Referring to FIG. 2, a food timing system for use in the food preparation area 22 includes a number of timer modules 32 for use with one or more food preparation devices and/or one or more food storage devices, which are hereinafter referred to as food holding devices 30. Preferably, the timer modules 32 are components of a wired or wireless network that forms the food timing system. In a first embodiment, as shown in FIG. 2, the food timing system further includes a centralized processor and a centralized memory for managing the connectivity, information sharing, and coupled operations of the timer modules 32. A stationary computing platform, such as a desktop personal computer, may provide the centralized processor and the centralized memory for the food timing system. The stationary computing platform may also be a dedicated computing system, such as a personal computer, that communicates with other stationary and/or mobile computers in the food timing system. Alternately, a mobile computing platform may provide the centralized processor and the centralized memory for the food timing system. The mobile computing platform may be a laptop personal computer or a personal digital assistant ("PDA"). Furthermore, both the stationary computing and the mobile computing platforms may be used so that the stationary computing platform can provide the centralized processor and the centralized memory for the food timing system, and the mobile computing platform can provide mobile or remote access to the food timing system. For example, an operator may link a PDA to the centralized processor and the centralized memory to remotely access the operational information of the food timing system. Accordingly, the operational parameters of the food timing system may be remotely adjusted, new parameters may be remotely input into the food timing system, and the operation of the food timing system may be remotely monitored. In a wireless food timing system, the components of the food timing system are linked in a wireless network in compliance with one or more wireless networking standards such as the IEEE 802.11b standard for wireless networking.

In a second embodiment (not shown), each timer module 32 includes a processor and a memory for managing the connectivity, information sharing, and coupled operations of the and timer modules 32. In a third embodiment (not shown), only one of the timer modules 32 includes a processor and a memory and manages the connectivity, information sharing, and coupled operations of the timer modules 32. The wired and wireless networking configurations as described in relation to the first embodiment are equally applicable to both the second and third embodiments.

Figure 3:
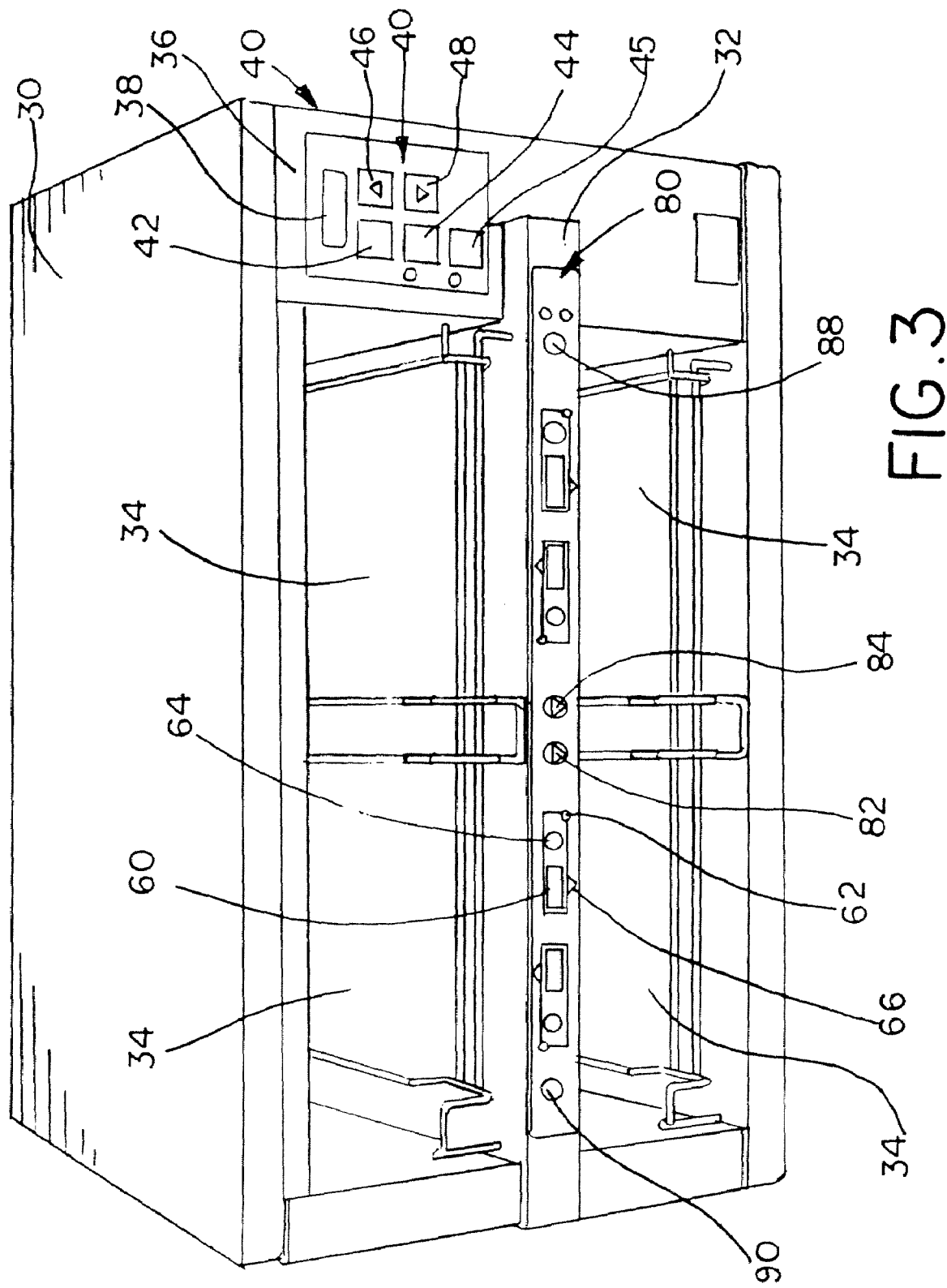
FIG. 3 is a front perspective view of a food holding device having each display device adjacent an associated food holding compartment.
Figure 4:
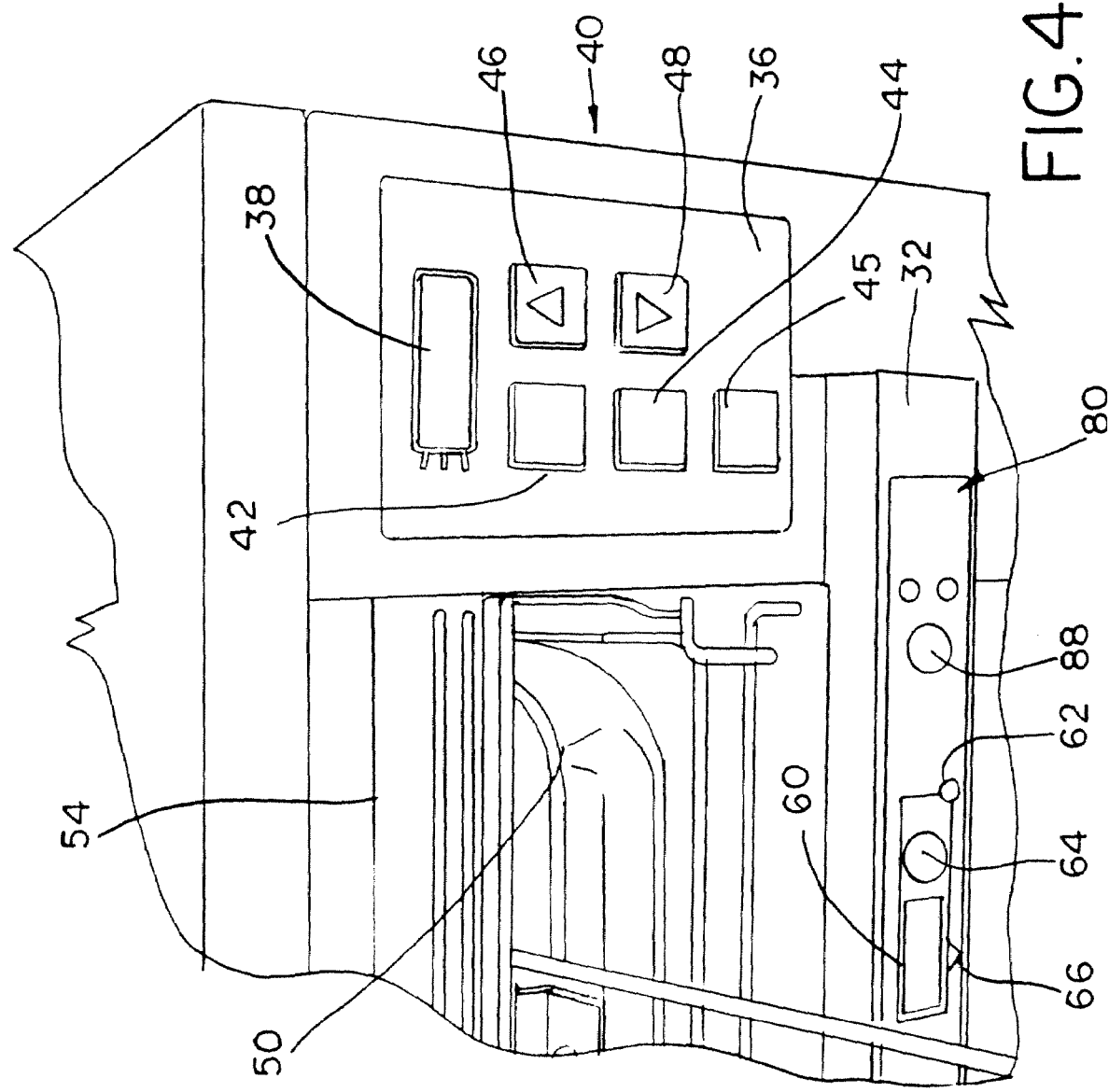
FIG. 4 is a close-up of the right side of the food holding device of FIG.

Referring to FIGS. 3-10, several food holding devices 30 are shown in more detail. Each food holding device 30 includes holding compartments 34 capable of maintaining food at a desired temperature. The temperature of each holding compartment 34 can be set and adjusted by a user with a temperature control device 36, which includes a temperature display device 38 and temperature input devices 40. The input devices 40 include activation/selection buttons, adjustment dials or buttons, or any other input device for allowing a user to set and adjust the temperatures of the holding compartments 34. In one embodiment, as shown in FIG. 4, the temperature input devices 40 include an "ACTUAL TEMP" button 42, a "SET POINT" button 44, a control button 45, an increase-temperature button 46 and a decrease-temperature button 48. Pressing the "ACTUAL TEMP" button 42 shows the actual temperature of a selected holding compartment 34. Pressing the "SET POINT" button 44 in combination with the control button 45 places the temperature control device 36 in temperature setting mode, which allows a user to set the temperature of one or more selected holding compartments 34 by increasing or decreasing temperature values with increase-temperature button 46 and decrease-temperature button 48, respectively, while the temperature value is being displayed on the temperature display device 38. In the temperature setting mode, the user can also set one temperature for the food holding device 30 (i.e., all food holding compartments 34).

Figure 8:
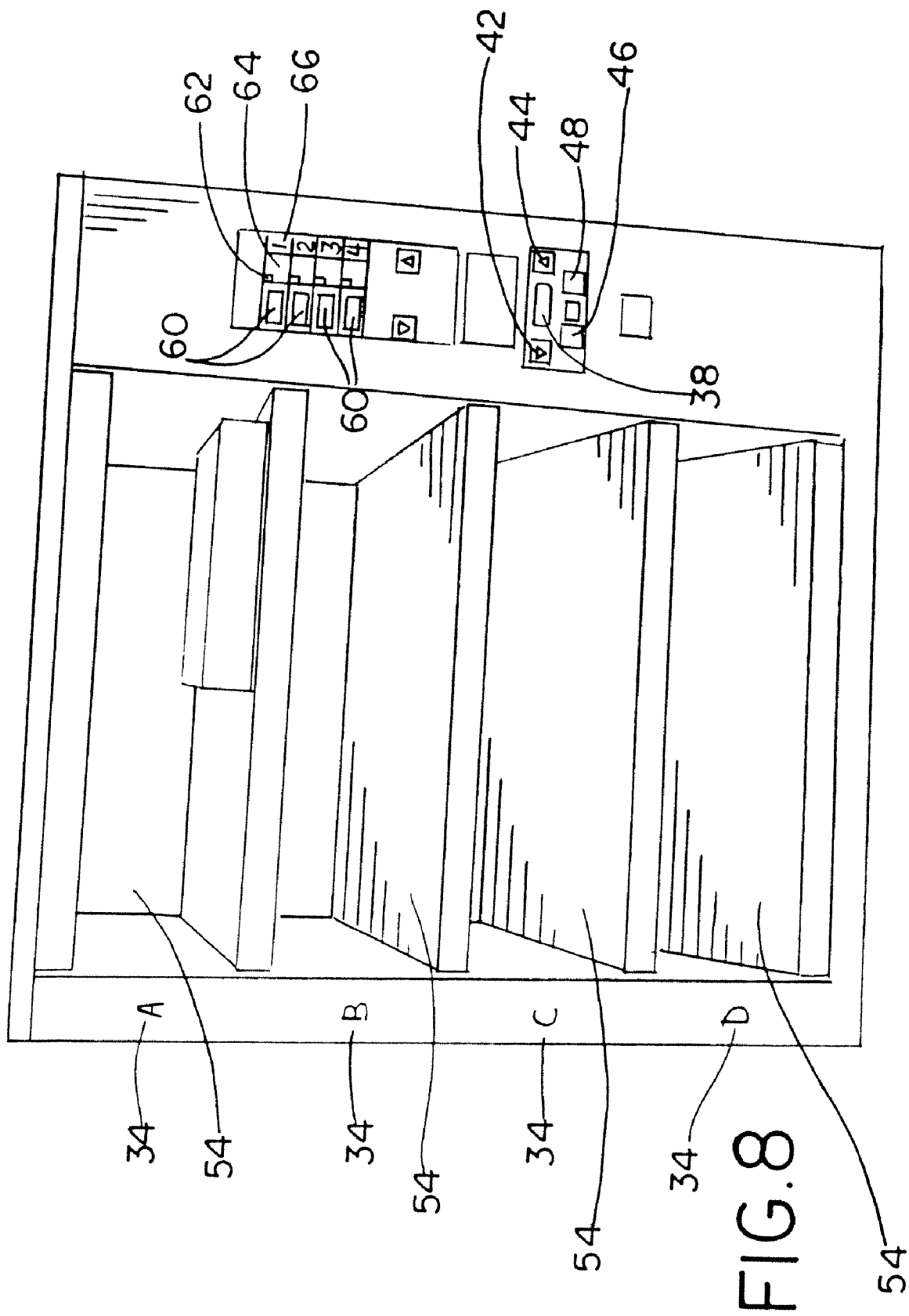
FIG. 8 is a front perspective view of a food holding device having four food holding compartments for storing pizza containers.
Figure 9:
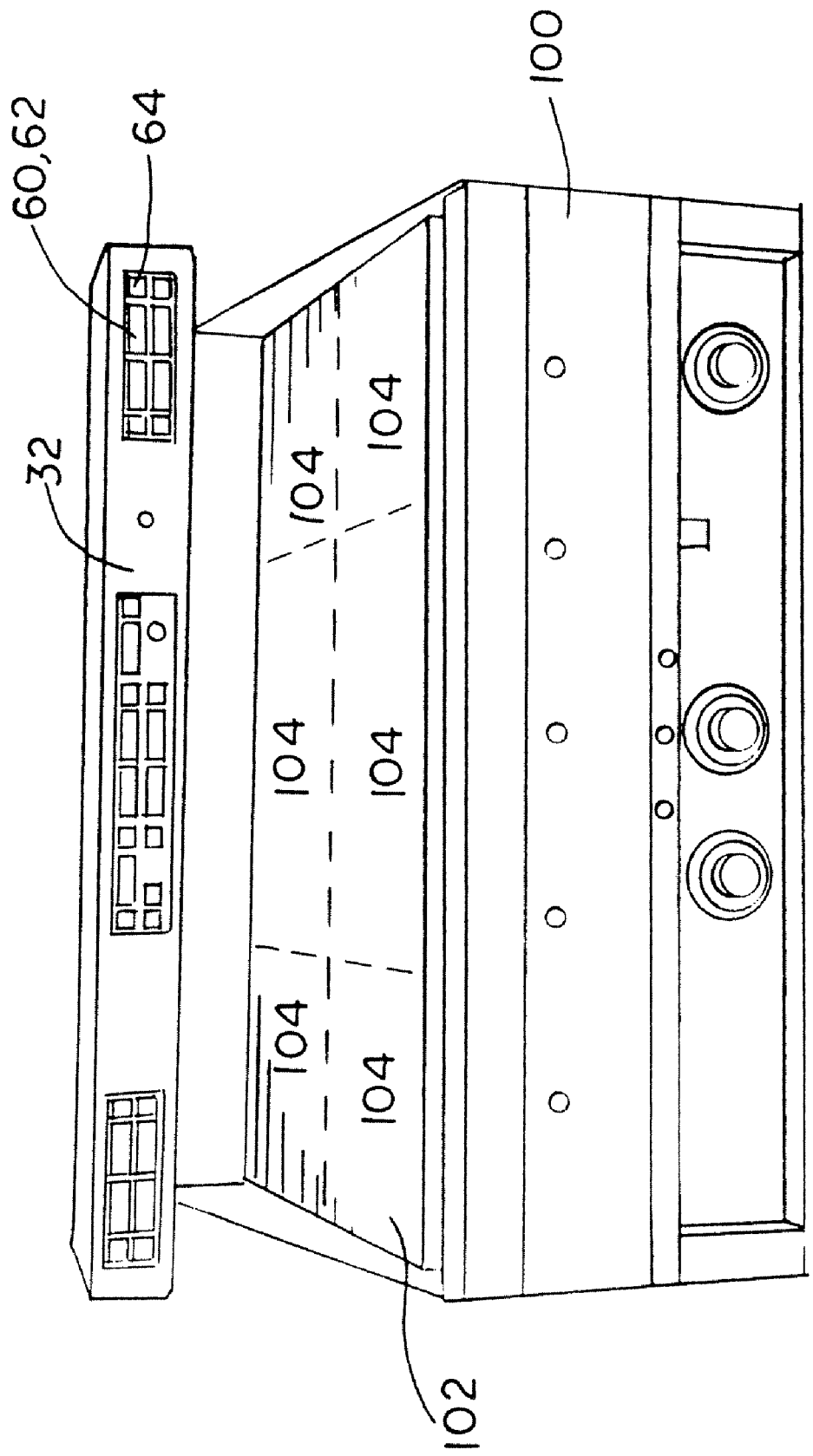
FIG. 9 is a front perspective view of a grill with a timer system in accordance with the present invention.
Figure 10:
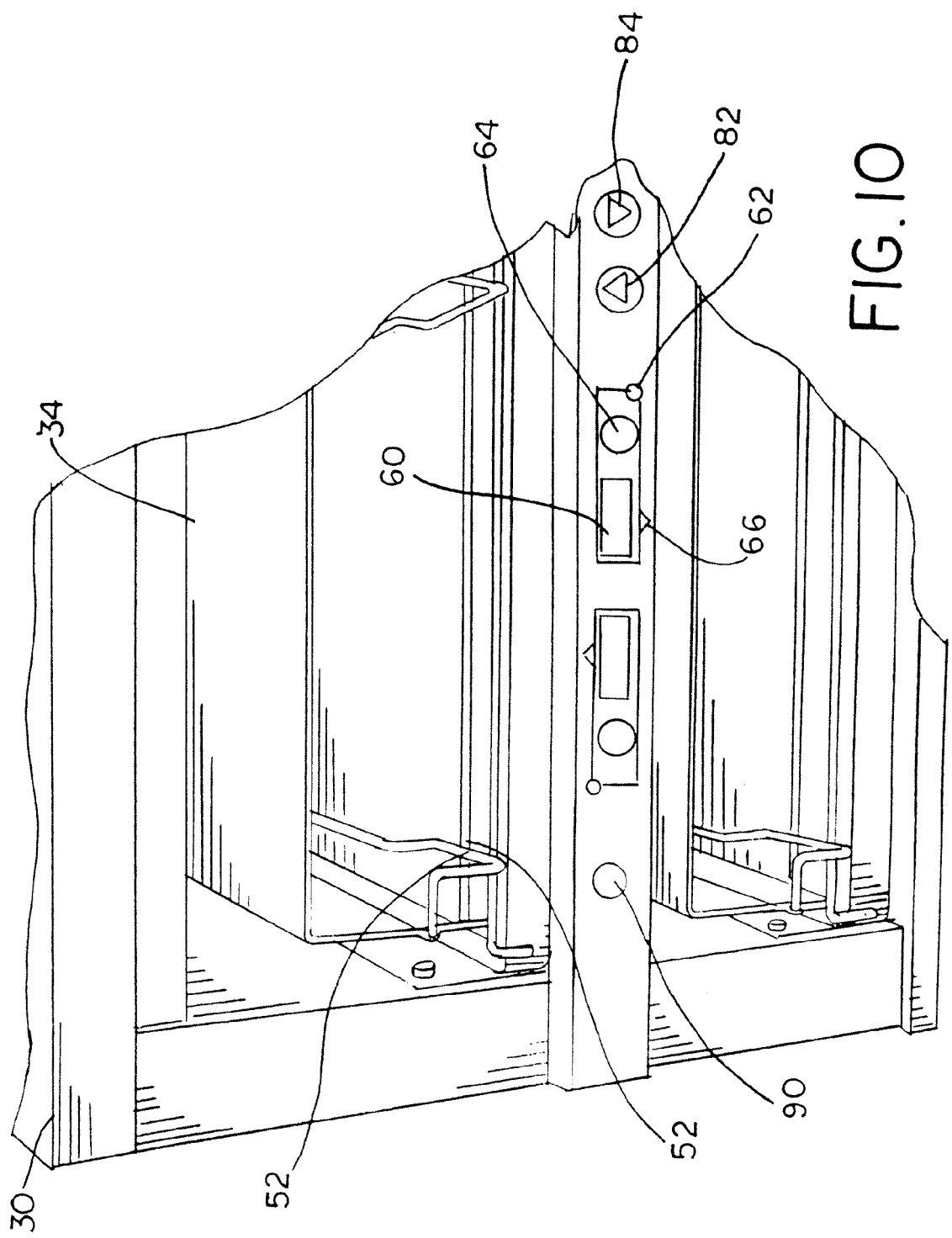
FIG. 10 is a close-up of a gliding rack of the food holding device of FIG. 3.

Preferably, the holding compartments 34 are arranged in the food holding devices 30 in a rectangular array with one or more holding compartments 34 in each row and one or more holding compartments 34 in each column. Depending on the function of the food holding device 30 (i.e., food storage or food preparation and the type of food product held within), each holding compartment 34 (shown in FIGS. 3-6) is configured for receiving a food holding container 50 (shown in FIG. 4), cavities 54 (shown in FIGS. 7 and 8) for receiving other types of food containers (e.g., disposable sandwich boxes), or simply configured for receiving food without any container or bin (shown in FIG. 9). For example, FIG. 3 shows a food holding device 30 with two rows and four columns of holding compartments 34 for receiving food holding containers 50. FIG. 8 shows a food holding device 30 that is used for holding cooked pizza, which is configured to receive typical pizza packaging boxes (i.e., small, medium, large, etc.) in cavities 54. Additionally, as shown in FIG. 10, each holding compartment 34 may have installed therein a gliding rack 52 for receiving a food holding container 50. The gliding rack 52 provides support for a food holding container 50, while being slidably pulled in and out of the food holding compartment 34. Thus, a user can completely pull out a food holding container 50 with the gliding rack 52 from an associated food holding compartment 34 and access the food therein without needing to support the weight of the food holding container 50 with one or both hands.

Referring to FIGS. 3 and 4, each timer module 32 for use with a food holding device 30 includes timers (not shown), display devices 60, timer status indicators 62, and timer buttons 64. Each timer module 32 is associated with a food holding device 30 and may be either integrated with, attached to or placed proximate to the associated food holding device 30. One of ordinary skill in the art will readily appreciate that association of a timer module 32 with a food holding device 30 by methods just described may provide communication between the timer module 32 and the food holding device 30. For instance, operating parameters of a food holding device, such as temperature settings may be communicated to the timer module 32 so that such data may be available to the timing system. Additionally, the timing system may be capable of issuing commands to alter such operational parameters that can be communicated to the food holding device 30 through an associated timer module 32.

The timers of the timer modules 32 measure the holding period of food in each holding compartment 34 of the food holding device 30. The holding period of food in a holding compartment 34 is measured from the time the food is placed in the holding compartment 34 to when the food has expired, i.e., the food is no longer fit to be served to customers. Each display device 60 is associated with a holding compartment 34 and displays information about the food therein. The display devices 60 display the identity of the food that is held in the holding compartments 34, but can display or indicate a variety of information about the food. The display devices 60 are capable of displaying alphanumeric information, graphic information, or both about the food. Displaying the identity of a food product can be accomplished by alphanumerically displaying the name of the food product or an abbreviation thereof, such as "EGGS" for eggs, or "BISC" for biscuits (shown in FIGS. 3 and 4). Alternately, the identity of a food can be displayed graphically. For example, an image of an egg can be displayed on a display device 60 (not shown) to show that eggs are being held in the associated holding compartment 34.

Figure 5:
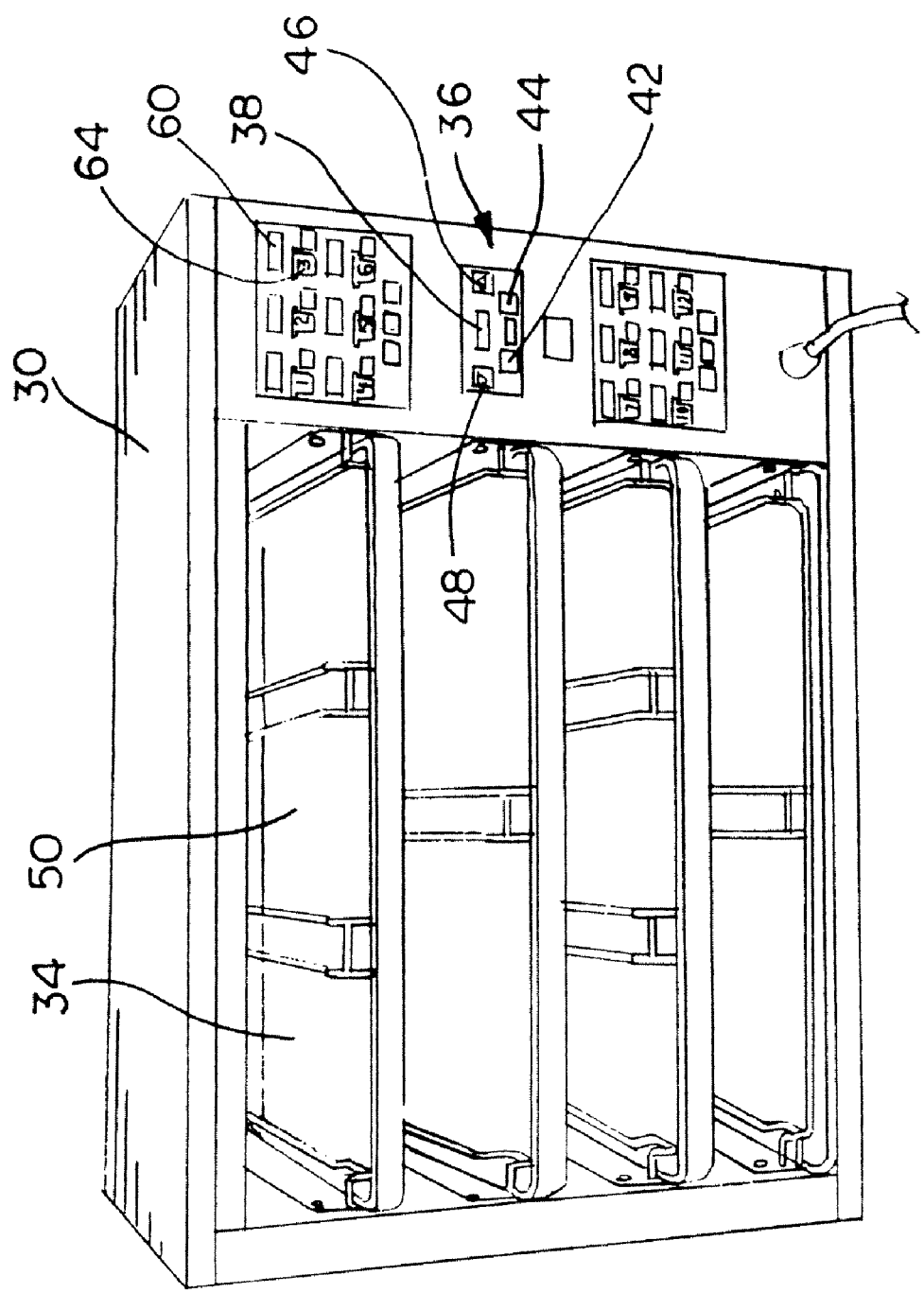
FIG. 5 is a front perspective view of a food holding device having each display device in a display block.
Figure 6:
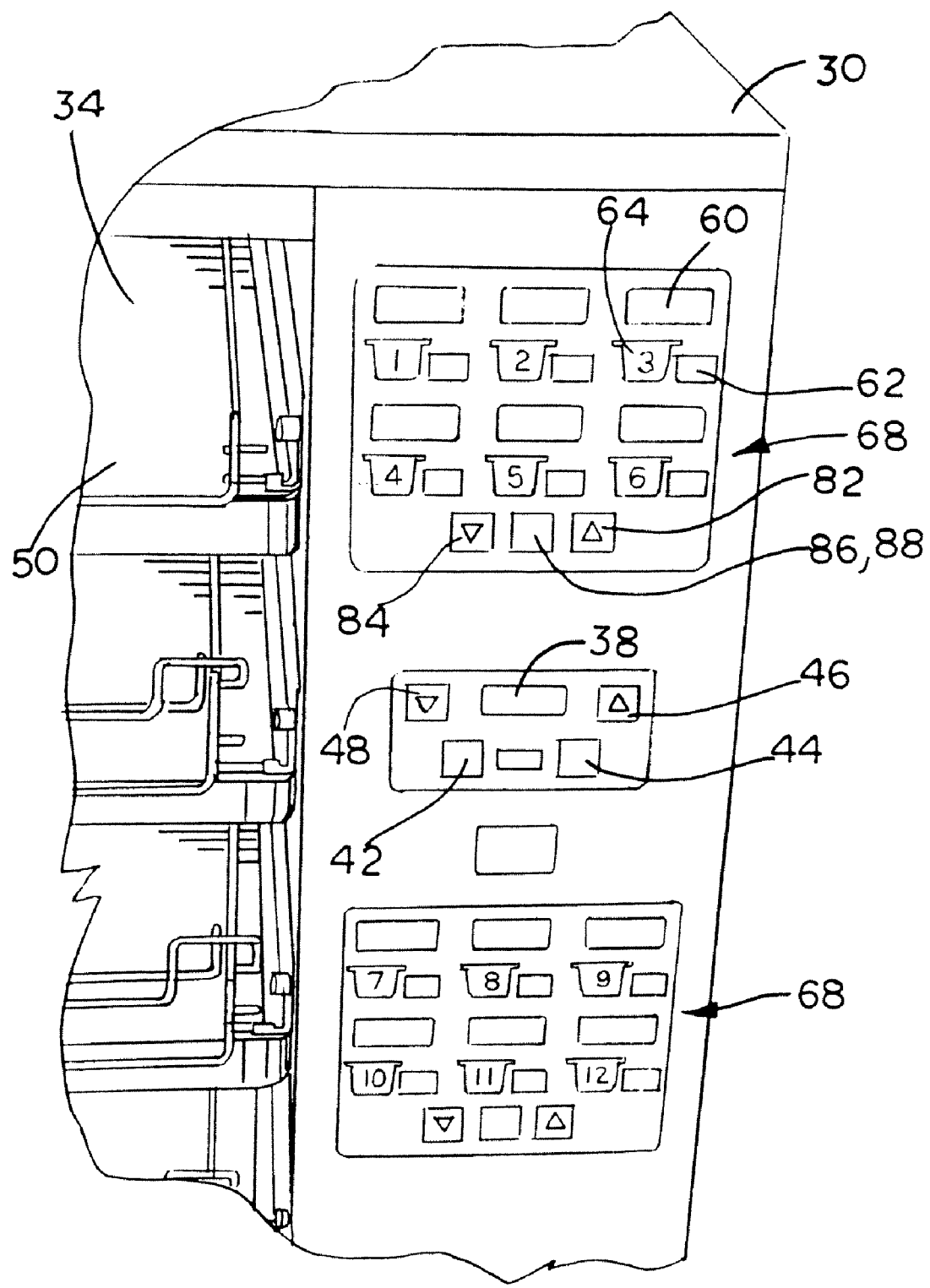
FIG. 6 is a close-up of the right side of the food holding device of FIG. 5.
Figure 7:
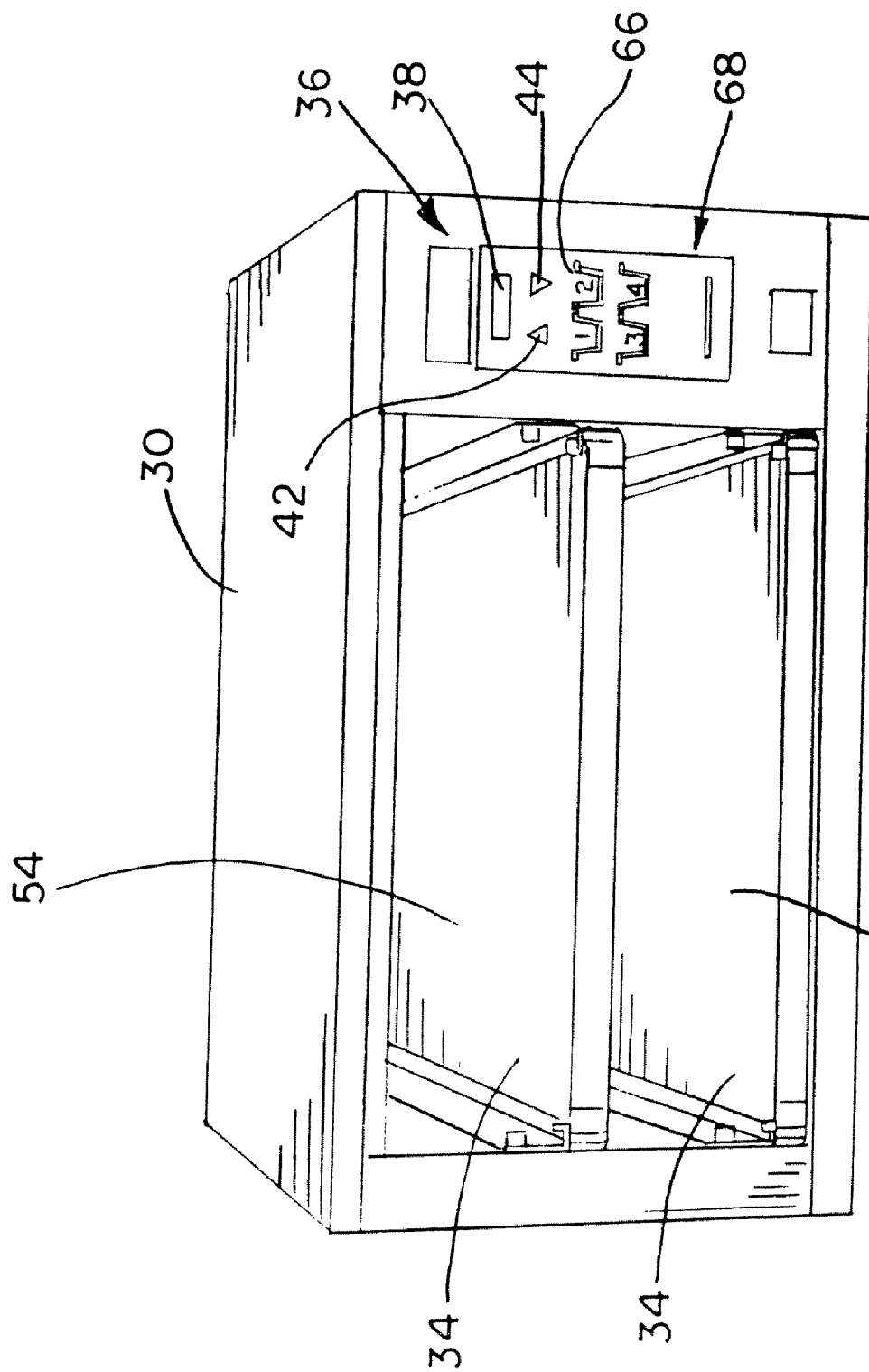
FIG. 7 is a front perspective view of a food holding device having two food holding compartments and display devices in a display block.

The display devices 60 are positioned on the timer modules 32 such that a user can visually determine which display device 60 is associated with which holding compartment 34. FIGS. 3, 4 and 5-8 show two alternate methods of positioning each display device 60 relative to an associated holding compartment 34. In a first method, as shown in FIGS. 3 and 4, each display device 60 is positioned near an associated holding compartment 34 so that a user of the food holding device 30 can intuitively determine the association of the display device 60 with its associated holding compartment 34. Additionally, if a display device is equally near two or more holding compartments 34, a visual indicator 66, such as an arrow, can direct a user to the holding compartment 34 to which the display device 60 is associated. FIGS. 5 and 6 show a second method of visually associating a display device 60 with a holding compartment 34. The display devices 60 are arranged in a display block 68 on the food holding device 30. The arrangement of the display devices 60 on the display block 68 relative to each other corresponds to the arrangement of the holding compartments 34 relative to each other. For example, as shown in FIGS. 5 and 6, the display device 60 in the first column and first row (taken from the left side) of the display block 68 is associated with the holding compartment 34 in the first row and first column (taken from the left side) of the food holding device 30. Similarly, as shown in FIG. 8, the top display device 60 in the display block 68 is associated with the top holding compartment 34 in the food holding device 30.

Each timer status indicator 62 is associated with a holding compartment 34 and indicates the status of the food therein. The timer status indicators are preferably LEDS (light emitting diodes) that are capable of displaying any color by using either the three traditional primary colors of red, yellow, and blue, or the three secondary colors of magenta, yellow, and cyan. The LEDS are also capable of being on or off, and displaying flashing on/off with the speed of the flashing being adjustable. One of ordinary skill in the art will readily appreciate the flexibility of the LEDS to display any color for indicating the status of a food product associated with the timer status indicator. However, one of ordinary skill in the art will also readily appreciate that frequent use of the colors green, red and yellow to indicate status of a procedure or to direct a course of action in numerous areas of art has made these colors recognizable and even intuitive as to what each color indicates. For instance, a green indication is intuitively associated with normal, safe, or an unalarming status, the color yellow is intuitively associated with a cautionary status, and the color red is intuitively associated with an alarm, unsafe, or stop status. Accordingly, in the preferred embodiment, the LEDS of the timer status indicators 62 display the colors green, red and yellow to indicate the status of food in food holding compartments 34. However, as described in the foregoing, additional status indications may be used in the disclosed timer system as the LEDS are capable of displaying an unlimited number of colors. Furthermore, an operator may configure the disclosed timer system so that the LEDS indicate colors other than green, yellow and red for the status of food in the food holding compartments 34.

Referring to TABLE 1, each timer status indicator 62 includes a first indication indicating that the associated holding compartment 34 is ready to receive a food product and a second indication indicating that the food in the associated holding compartment 34 has expired. The first indication may be indicated with a steady red LED, and the second indication may be indicated with a red flashing LED. The timer status indicators further include a number of timing indications indicating the status of the food in the holding compartment 34 when the holding period of food is being measured and the food has not yet expired. The holding indications include a third indication, which indicates that the food in the associated holding compartment 34 has been held for the longest time relative to holding times for the same type of food being held in other holding compartments 34. In effect, the third indication indicates to a user that the food associated with the third indication is to be used before using the same type of food with shorter holding times in other holding compartments 34. The third indication may be indicated with a green LED. The other holding compartments that hold food with a shorter holding time, however, will indicate a fourth indication. In effect, the fourth indication indicates that another holding compartment has the same type of food that has been held for a longer time. The fourth indication may be indicated with a steady yellow LED. When the LEDS flash on/off in any of the above-disclosed colors, the intention is to alert a user to take a specific action regarding the food products in the holding compartments 34. As disclosed, a red flashing LED indicates that the food product has expired and should be discarded. A green flashing LED and a yellow flashing LED, being fifth and sixth indications respectively, indicate that the food in the associated holding compartment 34 is near expiration. The fifth indication is activated when the time remaining before a food in an associated holding compartment 34 expires is less than or equal to the time it takes to cook that food, and when the holding time of the food is the longest compared to the holding times for the same type of food in the other holding compartments 34. The sixth indication is activated when the time remaining before a food in an associated holding compartment 34 expires is less than or equal to the time it takes to cook that food, and when another holding compartment 34 has the same food product with a longer holding time. In effect, the fifth and sixth indications indicate to a user that more of the food that is about to expire should be cooked so as to provide a fresh supply of that food for service to customers. Additionally, the fifth indication indicates to a user to use the food product in the holding compartment 34 that is associated with the fifth indication first, and the sixth indication indicates to a user that another holding compartment 34 is holding the same type of food product with a longer holding time (i.e., indicating a fifth indication). The timer status indicator also includes a seventh indication indicating that the associated holding compartment 34 is not active. The seventh indication is preferably indicated with the LED being turned off.

TABLE 1

| LED | Indication | Action |
| --- | --- | --- |
| STEADY RED (first indication) | Standby | None. Associated food holding compartment 34 is ready for receiving and timing a food product. |
| FLASHING RED (second indication) | Food product has expired. | Discard food product. |
| STEADY GREEN (third indication) | Timing in progress. Oldest food product of its kind. | Use this food product first. |
| STEADY YELLOW (fourth indication) | Timing in progress. An older food product of this kind is available. | Use the older food product of this kind first. |
| FLASHING GREEN (fifth indication) | Timing in progress. Food product is near expiration and it is the oldest food product of its kind. | Cook more of this food product. Use this food product first. |
| FLASHING YELLOW (sixth indication) | Timing in progress. Food product is near expiration and an older food product of this kind is available. | Cook more of this food product. Use the older food product first. |
| OFF (seventh indication) | food holding device not operating | None |

Timer activation/deactivation may be automatically performed when a food holding container 50 is inserted/removed from an associated food holding compartment 34, respectively. For instance, a sensor on a timer module 32 can detect insertion and removal of a food holding container 50 into and from an associated food holding compartment 34, respectively. In another preferred example, a bar code label or a smart tag (i.e., a programmable chip) may be placed on each food holding container 50 for detection and reading thereof by an associated timer module 32. In such a case, the bar code label or the smart tag may convey information about the food in the food holding container 50 to the timer system. When a smart tag is placed on the food holding container 50, the smart tag may convey information about the food in the food holding container 50 to the timer system, and the timer system may store information on the smart tag so that such information remains with the food holding container 50 no matter where in the restaurant and into which food holding device 30 the food holding container 50 is transferred. The information on a smart tag may be programmed, updated, or reset by a user or automatically depending on events, time of day, or other restaurant operating conditions and criteria.

A timer may also be activated/deactivated by an associated timer button 64. Pressing a timer button 64 when its associated timer is inactive will activate the timer, and pressing the timer button 64 when the timer is active will inactivate the timer. In another preferred example, a timer may be activated/deactivated by user voice commands with a microphone placed on an associated timer module 32 that can pick up verbal commands such as "activate," "inactivate," "on," "off," or the like. In yet another preferred example, a user may activate/deactivate a timer remotely by a wireless or wired device such as a PDA or a laptop, or a customized communication device (i.e., display and sound capable) that is in communication with the disclosed timing system.

A food product in a holding compartment 34 can be transferred to another holding compartment 34 of the same or different food holding device 30. The timer module 32 is capable of transferring the holding time of the food being transferred and all information about that food to the timer that is associated with holding compartment 34 that is receiving the transferred food product. The timer of the receiving holding compartment 34 receives the elapsed holding time of the transferred food product and begins measuring the holding time from the elapsed time. Additionally, the information about the transferred food product will be used by the timer status indicator 62 of the receiving holding compartment 34 to signal the user to take a required action if necessary (i.e., cook more food, discard expire food, etc.). In food timing systems where the timer module 32 is in communication with the food holding device, the temperature of the holding compartment 34 may also be adjusted by an associated timing module 32 if necessary to accommodate the transferred food product. The temperature adjustment may only be desired if the transferred food product is different than the food product for which the receiving holding compartment 34 was configured for prior to the transfer.

Each food timer module 32 further includes a programming system (not shown) for receiving input from a user regarding food products and the operational parameters of each timer. The programming system includes an input system 80 and may include one or more display devices (not shown). The programming system may use the display devices 60 of the timer module 32 in lieu of one or more separate, dedicated display devices. As shown in FIGS. 3 and 4, the input system 80 may include an up-arrow button 82 and a down-arrow button 84 for increasing and decreasing the value of a parameter, or scrolling up and down through a list of parameters, respectively. The programming system further includes one or more selection/activation buttons 86 (only one shown in FIGS. 3 and 4) for activating and/or selecting an operational parameter or mode for the food holding device 30, or obtaining information about the food products being held in the food holding device 30. The programming system of the timer module 32 for each food holding device 30 is operationally coupled to the display devices 60, the timers, the timer status indicators 62, and the timer buttons 64 of the food holding device 30. For timing systems that provide communication between the timer module 32 and an associated food holding device 30, the programming system may also be coupled to the food holding device 30.

The food timer module 32 further includes a food menu (not shown) containing information about the food products that are held in the holding compartments 34. The information includes the identity of each food product, the holding time of a food product before it expires, and a cook time for each food product. The food menu contains information about the food that is typically sold in the restaurants in which the food holding devices 30 are used, particularly foods that involve preparation before sales (e.g., rethermalization, cooking, warming, thawing, etc.). The food menu further includes the capability to group selected food products into activity menus, which contain food products that are either served together or served at a particular period during the day. Each activity menu contains a food product assignment for one or more timers. Selection of an activity menu assigns the foods in that activity menu to the timers associated with the holding compartments 34 in which the foods in the activity menu will be held. Furthermore, the assignment of food products in the activity menu to the timers also makes available to each timer information about its assigned food product. For example, a specific breakfast activity menu may assign eggs to one or more timers, sausage to one or more other timers, and bacon to the remaining timers. A lunch activity menu, for example, may assign burgers to one or more timers, chicken to one or more other timers, and fish to the remaining timers.

The food products in the food menu and the groupings of the food products in each activity menu can be pre-programmed to default values or customized by a user. The programming, selection, and activation of the food products in the food menu or the food products in the activity menu can be accomplished by the input system 80 of the programming system. Additionally, the activity menus and contents thereof may be automatically changed based on time of day or event. For instance, at a certain time of day, the activity menu may be automatically changed from breakfast to lunch. On weekends, for instance, the time when the activity menu changes from breakfast to lunch may be later or sooner depending on the needs of the restaurant. One of ordinary skill in the art will readily appreciate that the programming system of the timing system provides a user with the ability to set automatic activity menu changes based on any factor that may be specific to the operation of a particular restaurant.

Operation

When the timers do not have any food product assignments and the associated holding compartments 34 of the timers are inactive, the LEDS of the timer status indicators 62 will be off and the display devices 60 display nothing or a series of dashes (i.e., " - - - "). Each timer of a timer module 32 is assigned a food product prior to activation. The assignment of food products to the timers makes available information about the food products to the timers. To select an activity menu, a user while pressing and holding an activity button 88 scrolls through the available activity menu with the up-arrow button 82 and the down-arrow button 84. Pressing the activity button 88 displays the available activity menus on the display devices 60 so as to allow the user to visually select an activity menu. Releasing the activity button 88 when the desired activity menu appears on the display device 60 selects the displayed activity for the timer module 32.

When an activity menu is selected, each food product in the activity menu and information about the food product contained in the food menu is assigned to a timer. Also, the display devices 60 will display the identity of each food product assigned to an associated timer. Each timer is now ready to measure the holding time of a food product that will be held in an associated holding compartment 34, which will be shown by a first indication on the timer status indicators 62. Thus, the timers that have been assigned food products will have the LED of their associated timer status indicators 62 displaying a steady red color.

To start a timer, a user places a holding bin 52 having food product therein in the holding compartment 34 that is associated with the timer. Thereafter, the user activates the timer, which will change the timer status indicator 62 to one of the holding indications depending on the timing status of the same type of food product in other holding compartments 34. If no other holding compartment 34 in the food holding device 30 is holding the same type of food product, the LED of the timer status indicator will display a steady green. If there are other holding compartments 34 in the food holding device 30 that are holding the same type of food product, the LED of the timer status indicator 62 of the holding compartment 34 that is holding the food product with the longest elapsed holding time will display a steady green. The LEDS of the timer status indicators 62 of all other food holding compartments 34 that are holding the same type of food product with the shorter elapsed holding times will indicate a steady yellow. Thus, the timer module 32 directs a user to always use the food product with the longest elapsed holding time first.

The LEDs of the timer status indicators 62 also have flashing indications indicating that more of the food product held in an associated holding compartment 34 should be cooked. An LED of a timer status indicator 62 begins flashing when the time remaining on an associated timer before the food product expires is equal or less than the time required to cook more of that food product. Thus, a flashing LED indicates to a user to cook more of the food product being held in the associated holding compartment 34. A flashing yellow LED indicates to a user to cook more of the food product and that another holding compartment 34 in the food holding device 30 is holding the same type of food product with a longer holding time. A flashing green LED indicates to a user to cook more of the food product, and that the food product has the longest holding time as compared to other holding compartments 34 that are holding the same type of food product. When a product expires, the LED of the associated timer status indicator displays a flashing red. Additionally, the display device 60 associated with the holding compartment 34 in which the expired food product is held may flash the abbreviated name of the food product. The user is directed by the flashing red display of the LED to discard the expired food.

A user can transfer a food product and its timing information from one holding compartment 34, i.e., the origin holding compartment 34, to another holding compartment 34, i.e., the destination holding compartment 34. One of ordinary skill in the art will readily appreciate that the disclosed timing system can be configured to provide a desired transfer procedure or sequence. Such a transfer procedure may include a sequence of inputs to the timing system and outputs from the timing system to guide a user through the transfer procedure. However, in the preferred embodiment, the transfer procedure is based on the following procedure. A user will press a transfer button, which causes the displays 60 of active timers to brighten and the displays 60 of inactive timers to dim. The transfer button may be a button that is dedicated to performing such a function, such as button 90 shown in FIG. 3. The transfer button may also be a multi-function button that performs other functions. For example, the up-arrow button 82 can take on the function of a transfer button when the timer system is in running mode, and take on the up-arrow function when the timer system is in programming mode. After the transfer button 90 or 82 is pressed, the brightened displays 60 of the active timers inform a user about the food holding compartments 34 that are active and available as origin food holding compartments 34 for the transfer. The user then removes the food in the origin food holding compartment and deactivates its associated timer. The user then depresses the transfer button 90 or 82, which causes the displays 60 of all active timers to dim and the displays 60 of all inactive timers to brighten. Thus, the brightened displays 60 of the inactive timers inform the user about the food holding compartments 34 that are inactive and available as destination food holding compartments 34 for the transfer. The user subsequently completes the transfer procedure by placing the food that was removed from the origin food holding compartment 34 into the destination food holding compartment 34 and activating the timer associated with the destination food holding compartment 34.

Timing Systems' Connectivity

Referring to FIG. 2, the timer modules 32 and the food holding devices 30 may be connected together in a wired or wireless network. The networking of the timer modules 32 and the food holding devices 30 provides for efficient and versatile food timing operations. The food menu for each timer module 32 can be shared with other timer modules 32, thereby allowing other timer modules access to information regarding each food product in the food menu. Additionally, user customization of a food menu or an activity menu will be available to other timer modules 32.

A significant advantage of the connectivity of the timer modules 32 is realized when transferring food products from an origin holding compartment 34 of a food holding device 30 to a destination holding compartment 34 in another food holding device 30. Because the timer modules 32 and the food holding devices 30 are connected in a network, transferring a food product from an origin holding compartment 34 to a destination holding compartment 34 in a different food holding device 30 will transfer the holding time of the food product and all the information about the food product to the timer associated with the destination holding compartment 34. Additionally, if the destination holding compartment 34 was originally assigned a different food product, the food timing system will assign the transferred food product to the destination holding compartment 34. However, after the time for the transferred food product expires in the destination food holding compartment 34, the timer system will revert back to the original assignment of the food holding compartment 34. For a timer system that provides communication between the timer modules 34 and the associated food holding devices 30, the reassignment of the transferred food product to the destination holding compartment 34 may also increase or decrease the temperature of the destination holding compartment 34 to the temperature required for holding the transferred food product.

Connectivity of the timer modules 32 in a network also allows for better management of food service operations in a restaurant. Inventory tracking algorithms can track food related information, including but not limited to such information as food product input/output of each food holding device 30, the amount of food products discarded, and the response of food service employees to various action signals issued by the timer modules 32 (i.e., cook more food, discard expired food, etc.). The connectivity of the timer modules 32 in a network environment provides a platform for connecting and communicating with other devices in a restaurant. For example, the cash registers from which a food order is received can be connected to the network of the timer modules 32 to better provide the timer modules 32 with information on the rate at which certain quantities of various food products should be prepared. Furthermore, such tracking of food orders and preparation will provide historical data that can be processed to provide the timer module 32 with the capability to adapt to food service requirements of a restaurant during certain periods of each day. One of ordinary skill in the art will appreciate the limitless ways by which the networking of the timer modules 32 can be utilized to significantly improve the efficiency, versatility and adaptability of the disclosed food timing system when used in a restaurant.

Applicability to Food Preparation Devices

The timer module 32, as disclosed in the above detailed description, is equally applicable to food holding devices 30 including food preparation devices such as ovens, grills, broilers, fryers, microwave ovens, etc. For example, FIG. 9 shows the timer module 32 applied to a grill 100. The surface 102 of the grill 100 can be visually compartmentalized to create preparation areas 104, which are analogous to holding compartments 34 in a food holding device 30. Each preparation area 104 is associated with a timer (not shown) in the timer module 32. A display device 60, a timer status indicator 62, and a timer button 64 is associated with each preparation area 104 of the grill 100. The display devices 60, timer status indicators 62, and timer buttons 64 are arranged in the display blocks 68. The input system 80 of the programming system (not shown) allows a user to select the default food menu and activity information or customize such information about food products that are cooked or warmed on the grill 100.

The operation of the timer module 32 as disclosed in the above detailed description is also equally applicable to the grill 100. If a food product is being cooked on the grill 100, the information about the food product that is assigned to an associated timer may include the food product's cook time so that the timer module 32 can alert a user that the food product is finished cooking. The information may also include the time that a cooked food product can remain on the grill before being overcooked and no longer fit for service to customers. A food product can be transferred from one preparation area 104 to another preparation area 104 on the grill 100. Furthermore, the grill 100 can be networked to other food preparation and holding devices in the food preparation area 22 to allow the transfer of food products from the grill 100 to those devices. For example, after a food product is cooked on the grill 100, a user may be alerted by an associated timer status indicator 62 of the timer module 32 of the grill 100 that the food product is cooked. The user can then transfer the cooked food product to a holding compartment 34 of a food holding device 30, which is a food storage device. During the transfer, information about the cooked food product is transmitted to the timer module 32 of the food storage device. The transfer is finalized by activating the timer of the food storage device that is associated with the transferred food product. As shown by the above example, one of ordinary skill in the art will appreciate the flexibility and versatility of the disclosed food timing system for it can be applied to any food preparation and storage device that is typically used in restaurants.

Several preferred embodiments of the present invention have been shown and described to illustrate the advantages and features of the present invention. Many additional changes and modifications could be made to the invention without departing from the fair scope and spirit thereof. The scope of some changes is discussed above. The scope of others will become apparent from the appended claims.

The invention claimed is:

1. A food holding device comprising:
   a plurality of holding compartments adapted to receive food products, each holding compartment capable of maintaining a temperature of an associated food product;
   a timer associated with each holding compartment and adapted to measure the holding period of the food product in the associated holding compartment;
   a display device associated with each holding compartment and adapted to display information about the associated holding compartment including information about the food product therein;
   a timer status indicator associated with each timer and adapted to indicate a status of the associated timer; and
   a timer button associated with each timer and operatively coupled to the associated timer; and
   a transfer button adapted to initiate the transfer of the holding period from the timer associated with an origin holding compartment to the timer associated with a destination holding compartment, the timers being operatively coupled to each other.

2. The food holding device of claim 1, each timer status indicator is configured to provide a first indication indicating that an associated holding compartment is ready to receive a food product and the associated timer is not active, a plurality of timing indications indicating that the associated holding compartment is holding a food product and the associated timer is measuring the holding period of the food product therein, and a second indication indicating that the holding period for the food product in the associated holding compartment has expired.

3. The food holding device of claim 2, the plurality of timing indications comprising a third indication indicating that a food product in an associated holding compartment has been held for the longest time relative to the holding times for the same type of food product in other holding compartments of the food holding device, a fourth indication indicating that another holding compartment is holding the same type of food product that has been held for a longer time, a fifth indication indicating that a food product in an associated holding compartment will soon expire, and a sixth indication indicating that the associated holding compartment in not active.

4. The food holding device of claim 1, further comprising a programming system adapted to receive input including information about food products and operational parameters for each of the timers, the programming system further including a programming display device and an input device, wherein the programming system is operatively coupled to the display devices, the timers, the timer status indicators and the timer buttons.

5. The food holding device of claim 1, further comprising:
   a food menu containing information about food products including at least the identity of each food product;
   a plurality of activity menus, wherein each activity menu includes a selectable group of food products from the food menu; and
   a group selection button adapted to provide user selection of an activity menu, wherein selection of an activity menu makes available information about the food products in the selected activity menu to the display devices, timers and timer status indicators.

6. The food holding device of claim 1, wherein the timer status indicator associated with each timer is comprised of light emitting diodes (LEDs).

7. The food holding device of claim 1, wherein the display associated with each holding compartment is adapted to display alphanumeric information.

8. The food holding device of claim 1, wherein the display associated with each holding compartment is adapted to display graphic information.

9. The food holding device of claim 1, wherein the display devices are arranged in a display block, the arrangement of the display devices in the display block corresponding to the arrangement of the holding compartments in the food holding device, further wherein the position of a first display device relative to a second display device in the display block corresponds to the position of a first holding compartment associated with the first display device relative to a second holding compartment associated with the second display device.

10. The food holding device of claim 9, further comprising visual indicators indicating the association of each of the display devices with an associated holding compartment.

11. The food holding device of claim 1, wherein each display device is arranged near an associated holding compartment wherein the position of the display device relative to the associated holding compartment indicates the display device is associated with the holding compartment.

12. The food holding device of claim 11, further comprising visual indicators indicating the association of each of the plurality of the display devices with an associated holding compartment.

13. A timer system for use with a food preparation device, the timer system comprised of:

a plurality of timers, each timer associated with a respective one of a plurality of holding compartments of the food preparation device and adapted to measure the holding period of a food product therein;

a plurality of display devices, each display device associated with a holding compartment of the food preparation device and adapted to display information about the holding compartment including at least the identity of the food product therein;

a plurality of timer status indicators, each timer status indicator associated with a timer and adapted to indicate a status of the associated timer; and a plurality of timer buttons, each button associated with a timer and operatively coupled to the associated timer; and at least one transfer button adapted to initiate the transfer of the holding period from a timer associated with an origin holding compartment to a timer associated with a destination holding compartment, the timers of the timer system being operatively coupled and adapted to transfer the holding period of a food product from a timer associated with the origin holding compartment to a timer associated with the destination holding compartment, when the food product in the origin holding compartment is transferred to the destination holding compartment.

14. The timer system of claim 13, each timer status indicator being configured to provide: a first indication indicating that an associated holding compartment is ready to receive a food product and the associated timer is not active, a plurality of timing indications indicating that the associated holding compartment is holding a food product and the associated timer is measuring the holding period of the food product, and a second indication indicating that a holding period for a food product in an associated holding compartment has expired.

15. The timer system of claim 14, the plurality of timing indications comprising a third indication indicating that a food product in an associated holding compartment has been held for the longest time relative to the holding times for the same type of food product in other holding compartments of the food preparation device, a fourth indication indicating that another holding compartment is holding the same type of food product that has been held for a longer time, a fifth indication indicating that a food product in an associated holding compartment will soon expire, and a sixth indication indicating that the associated holding compartment in not active.

16. The timer system of claim 13, further comprising a programming system adapted to receive input including information about food products and operational parameters for each of the holding compartments of the food preparation device, the programming system further including a programming display device and an input device, wherein the programming system is operatively coupled to the display devices, the timers, the timer status indicators and the timer buttons.

17. The timer system of claim 13, further comprising:

a food menu containing information about food products including at least the identity of each food product, a holding time for each food product and a cook time for each food product;

a plurality of activity menus, wherein each activity menu includes a selectable group of food products from the food menu; and a group selection button adapted to provide user selection of an activity menu, wherein selection of an activity menu makes available information about the food products in the selected activity menu to the display devices, timers and timer status indicators.

18. The food holding device of claim 13, wherein the timer status indicators are comprised of light emitting diodes (LEDs).

19. The timer system of claim 13, wherein the display devices are adapted to display alphanumeric information.

20. The timer system of claim 13, wherein the display devices are adapted to display graphic information.

21. The timer system of claim 13, wherein the display devices are arranged in a display block, the arrangement of the display devices in the display block corresponding to corresponds to the position of a first holding compartment associated with the first display device relative to a second holding compartment associated with the second display device.

22. The timer system of claim 21, further comprising visual indicators indicating the association of each of the display devices with an associated holding compartment.

23. The timer system of claim 13, wherein each display device is arranged near an associated holding compartment of the food preparation device, further wherein the position of the display device relative to the associated holding compartment indicates the display device is associated with the holding compartment.

24. The timer system of claim 23, further comprising visual indicators indicating the association of each of the display devices with an associated holding compartment.

* * * * *